United States Patent
Raghavan et al.

(10) Patent No.: US 10,069,708 B2
(45) Date of Patent: Sep. 4, 2018

(54) MONITORING THROUGH S-BFD (SEAMLESS BIDIRECTIONAL FORWARDING DETECTION)

(71) Applicant: CISCO TECHNOLOGY, INC., San Jose, CA (US)

(72) Inventors: Srihari Raghavan, Chennai (IN); Nobushige Akiya, Kanata (CA); Carlos M. Pignataro, Raleigh, NC (US); Mallik Mudigonda, Chennai (IN); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 14/635,438

(22) Filed: Mar. 2, 2015

(65) Prior Publication Data
US 2016/0261474 A1 Sep. 8, 2016

(51) Int. Cl.
*H04L 12/26* (2006.01)
*H04L 12/24* (2006.01)

(52) U.S. Cl.
CPC .......... *H04L 43/10* (2013.01); *H04L 41/5012* (2013.01)

(58) Field of Classification Search
CPC ... H04L 45/026; H04L 41/0686; H04L 45/16; H04L 45/20; H04L 49/309
See application file for complete search history.

(56) References Cited

U.S. PATENT DOCUMENTS

| | | | |
|---|---|---|---|
| 8,650,048 B1* | 2/2014 | Hopkins, III | G06Q 40/08 705/4 |
| 2006/0233181 A1* | 10/2006 | Raszuk | H04L 45/02 370/401 |
| 2014/0157367 A1* | 6/2014 | Zhang | H04L 43/00 726/3 |
| 2014/0269699 A1 | 9/2014 | Filsfils et al. | |
| 2014/0307564 A1* | 10/2014 | Li | H04L 67/141 370/242 |
| 2015/0092564 A1* | 4/2015 | Aldrin | H04L 41/5038 370/241.1 |

OTHER PUBLICATIONS

N. Akiya et al., Seamless Bidirectional Forwarding Detection (S-BFD) Alert Discriminator and BFD Path Tracing, Internent Engineering Task force, Jan. 3, 2014, pp. 1-10.*
IETF Draft "Seamless Bidirectional Frowarding Detection (S-BFD)", draft-ietf-bfd-seamless-base-03, N. Akiya et al., Aug. 23, 2014.
IETF RFC 5880, "Bidirectional Forwarding Detection (BFD)", D> Katz et al., Jun. 2010.

* cited by examiner

*Primary Examiner* — Romani Ohri
(74) *Attorney, Agent, or Firm* — Cindy Kaplan (57) ABSTRACT

In one embodiment, a method includes assigning a discriminator to a target in communication with a reflector at a network device, identifying at the reflector, a packet comprising the discriminator, the packet transmitted from an initiator in a seamless bidirectional forwarding detection (S-BFD) session, and transmitting a response packet from the reflector to the initiator. The response packet includes information for the target obtained by the reflector through monitoring of the target. The target may comprise a plurality of entities. An apparatus and logic are also disclosed herein.

18 Claims, 4 Drawing Sheets

MONITORING THROUGH S-BFD (SEAMLESS BIDIRECTIONAL FORWARDING DETECTION)

TECHNICAL FIELD

The present disclosure relates generally to communications networks, and more particularly, to monitoring through S-BFD (Seamless Bidirectional Forwarding Detection).

BACKGROUND

Bidirectional Forwarding Detection (BFD) is an IETF (Internet Engineering Task Force) standard that allows two endpoints to monitor reachability over a link or a network by both ends periodically sending "hello" packets to each other. It is an efficient and generic hello/keepalive protocol that is widely used by many applications, including, for example, IGPs (Interior Gateway Protocols), EGPs (Exterior Gateway Protocols) and protocols such as HSRP (Hot Standby Router Protocol), ICCP (Inter-Chassis Communication Protocol), and others.

The IETF BFD working group has been defining a more efficient unidirectional monitoring mechanism called Seamless Bidirectional Forwarding Detection (S-BFD).

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises assigning a discriminator to a target in communication with a reflector at a network device, identifying at the reflector, a packet comprising the discriminator, the packet transmitted from an initiator in a seamless bidirectional forwarding detection (S-BFD) session, and transmitting a response packet from the reflector to the initiator. The response packet includes information for the target obtained by the reflector through monitoring of the target, which comprises a plurality of entities.

In another embodiment, an apparatus generally comprises a processor for assigning a discriminator to a target in communication with a reflector at the apparatus, processing a packet comprising the discriminator and received from an initiator in a seamless bidirectional forwarding detection (S-BFD) session, and transmitting a response packet to the initiator, the response packet comprising information for the target. The apparatus further comprises memory for storing information for the target. The information comprises one or more diagnostic codes associated with the target and obtained through monitoring of the target at the reflector.

In yet another embodiment, logic is encoded on one or more non-transitory computer readable media for execution and when executed is operable to assign a discriminator to a target in an Internet of Everything/Internet of Things (IoE/IoT) domain, identify the discriminator in a packet received from an initiator in a seamless bidirectional forwarding detection (S-BFD) session, monitor and collect health information for the target, generate a response packet comprising the health information for the target, and transmit the response packet to the initiator.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A BFD (Bidirectional Forwarding Detection) session comprises a communication session set up according to BFD protocols between two nodes in a network (e.g., according to IETF (Internet Engineering Task Force) RFC (Request for Comments) 5880 ("Bidirectional Forwarding Detection (BFD)", D. Katz et al., June 2010)) or other suitable protocol. Seamless BFD (S-BFD), as described, for example, in IETF Internet Draft "Seamless Bidirectional Forwarding Detection (S-BFD) (draft-ietf-bfd-seamless-base-03, N. Akiya et al., Aug. 23, 2014), improves efficiency to expand failure detection coverage and allows BFD usage for additional scenarios. For example, BFD provides a one to one relationship between two endpoints, whereas S-BFD provides a many to one relationship between network entities wanting to monitor reachability to a target network entity. Also, BFD is stateful, whereas S-BFD is stateless on the target network entity. Another difference is that BFD is resource intensive, whereas S-BFD can be more resource friendly (e.g., for resources such as memory usage, CPU (Central Processing Unit) processing, and network resources), if creative design and implementations are applied.

The Internet of Things (IoT) describes the interconnection of uniquely identifiable embedded computing devices within the existing Internet infrastructure and covers a variety of protocols, domains, and applications. The Internet of Everything (IoE) brings together people, process, data, and things to make networked connections more relevant and valuable and turns information into actions that create new capabilities, richer experiences, and unprecedented economic opportunity for businesses, individuals, and countries. IoT/IoE provide intercommunication of various day-to-day as well as sophisticated devices with or without hierarchy, through various types of networks, including the Internet.

The embodiments described herein utilize a protocol such as S-BFD to effectively monitor anything (e.g., applications, services, devices) in IoT/IoE scenarios. One or more embodiments provide an IP (Internet Protocol) based framework for generalized monitoring and fault detection in the context of S-BFD. Certain embodiments may be used to link the fault and health monitoring aspects of an IoE/IoT domain with the rest of the world via IP layer protocols. The embodiments may, for example, provide flexibility as to when, where, and how the health of IoE/IoT devices can be queried. As described in detail below, one or more embodiments may utilize S-BFD diagnostic code extensions for problem identification or provide S-BFD aggregation or summarization for efficiently monitoring a scaled number of target entities. The embodiments may also eliminate the need for a network monitoring system. S-BFD reflector sessions may be extremely light weight socket-based applications and as such, can be effectively used to monitor any "thing", including, for example, services in Service Function Chaining (SFC) and IoT/IoE scenarios.

Figure 1:
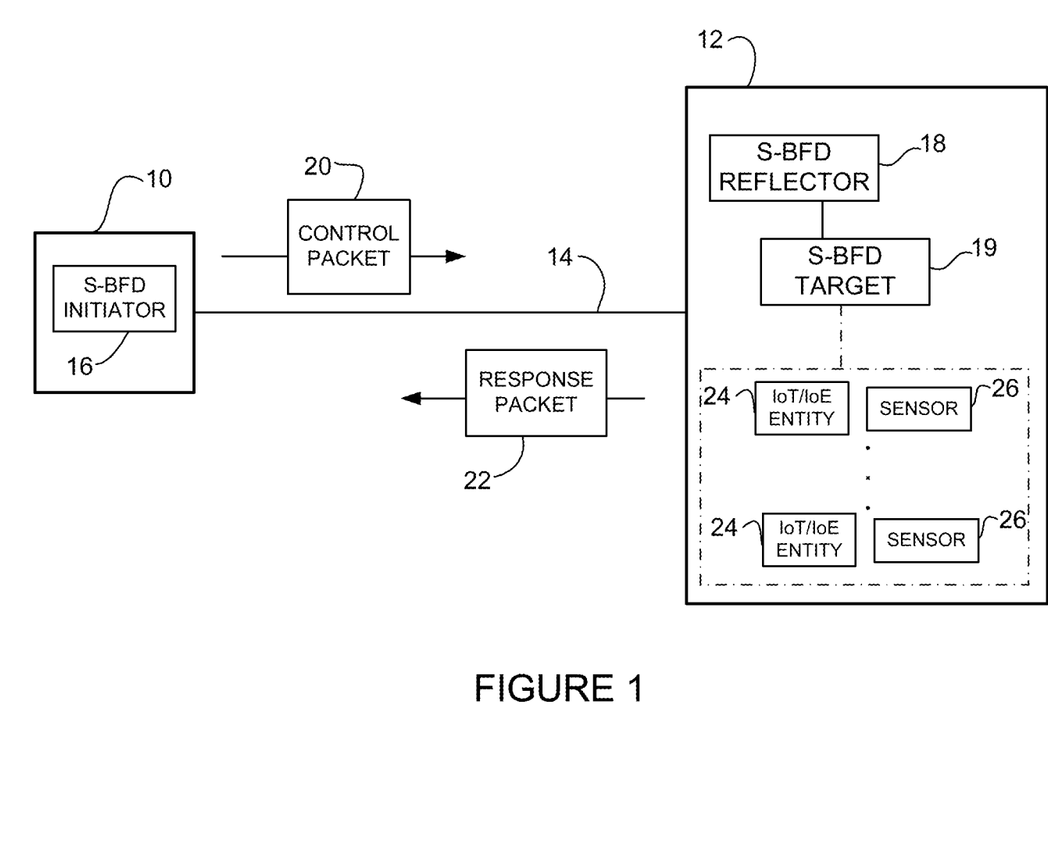
FIG. 1 illustrates an example of a network in which embodiments described herein may be implemented.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, controllers, gateways, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network).

The network shown in the example of FIG. 1 includes two network devices 10, 12 connected by a link 14. The network devices 10, 12 may be any computer, server, router, switch, bridge, gateway, load-balancer, firewall, processor, network appliance, or any other suitable device, component, element, or object capable of sending, receiving, or forwarding information over a communication network. In one example, S-BFD may be used to establish a session between an S-BFD initiator node 10 and S-BFD reflector node 12 over link 14. If more than one link 14 exists between the two endpoints 10, 12, multiple S-BFD sessions may be established.

In the example shown in FIG. 1, network node 10 hosts an S-BFD initiator 16 and network node 12 hosts an S-BFD reflector 18. Network node 12 further comprises a target 19, which may include one or more entities (e.g., IoT/IoE entity 24, sensor 26, plurality of entities/sensors) The IoT/IoE entity 24 may comprise, for example, a function, application, service, or device running on network node 12 that an S-BFD mechanism allows remote network node 10 to check. The IoT/IoE device may be part of an IoT/IoE domain and may be configured to provide health/fault monitoring including, for example, continuity checks per service function of a service function chain, networked vehicles in auto-pilot mode, networked sensors in airframes, data center load and energy use balancing, networking sensors for monitoring patient's health, smart home based applications, and many other applications.

As described below with respect to FIGS. 2A, 2B, and 2C, the initiator 16 may have an S-BFD session with any number of reflectors 18, and each reflector may monitor any number of entities 24 or sensors 26. Thus, node 12 may comprise any number of reflectors 18, entities 24, or sensors 26. The entities 24 or sensors 26 may be located in the same network device as the reflector 18 or another network device in communication with node 12. The entities 24/sensors 26 can therefore be local to the S-BFD module (reflector session) or located elsewhere in the network.

The S-BFD initiator 16 may initiate an S-BFD session on network node 10 that performs a test on remote target 19 by sending an S-BFD control packet 20. The S-BFD reflector 18 is created at node 12 to listen for incoming S-BFD control packets 20 comprising an assigned S-BFD discriminator associated with the target 19 (e.g., entity 24/sensor 26, or group of entities/sensors) being monitored. The S-BFD reflector 18 may monitor the health of the target 19, either through a continuous mechanism or as needed in an on-demand basis. Upon receiving an S-BFD control packet 20 targeted to one of the local S-BFD discriminator values, the node 12 may transmit a response S-BFD control packet 22 back to the initiator node 10. The response packet 22 may comprise information on the target (e.g., state, health, status, faults, diagnostic codes).

In one embodiment, an S-BFD module on network node 12 allocates one or more S-BFD discriminators for local entities and creates a reflector BFD session. Allocated S-BFD discriminators may be advertised by applications (e.g., OSPF (Open Shortest Path First), ISIS (Intermediate System-to-Intermediate System), or other protocols). Any suitable mechanism (e.g., in-band discriminator discovery, application specific protocol (in-band or out-of-band)) may be used to make the S-BFD discriminator values known to the S-BFD initiator 10. Other network nodes therefore know the mapping from remote entities to S-BFD discriminators. Once the setup is complete, any network node having knowledge of the mapping from a remote entity to an S-BFD discriminator, can quickly perform a check on the remote entity by sending an S-BFD control packet 20 with a corresponding S-BFD discriminator value in a Your Discriminator field, as described below.

Control packets 20, 22 may be used to establish the S-BFD session and may comprise, for example, an S-BFD control packet for the S-BFD mechanism. In one example, the S-BFD control packet 20 includes a My Discriminator field, which comprises a value generated by the transmitting endpoint 10 and a Your Discriminator field, received from the corresponding remote endpoint 12. The Your Discriminator value is set to the value assigned or advertised by the reflector node.

The control packets 20, 22 may be, for example, IPv4, IPv6, MPLS (Multiprotocol Label Switching), or any other suitable type of packet. The S-BFD packets 20, 22 may be encapsulated by a specific transport used for the S-BFD session. S-BFD may operate on top of any data protocol (network layer, link layer, tunnel, etc.), and may be used, for example, with MPLS, Segment Routing (SR), Software Defined Networking (SDN), or any other suitable protocols.

The S-BFD initiator 16 may send a control packet 20 to the reflector 18 with a specific S-BFD discriminator. The S-BFD reflector 18, upon receiving the packet 20 may generate a response packet 22 and transmit the packet back to the S-BFD initiator 16 if the target 19 is functioning. If the target 19 is not functioning, either a response is not generated or a response is generated with a specific diagnostic value to indicate a fault. In one embodiment, on low powered devices, the S-BFD reflector 18 may poll the target upon reception of the control packet 20 so that continuous monitoring by the S-BFD reflector of the target 19 is not needed. The S-BFD reflector 18 may operate as an IoT/Fog OAM aggregation point, and any remote device can use a common and efficient mechanism (e.g., S-BFD) in order to assess the availability of a wide range of entities 24/sensors 26.

The term "S-BFD discriminator" as used herein may refer to any identifier (e.g., number, letter, or combination thereof) that may be included in appropriate fields (e.g., My Discriminator, Your Discriminator) in an S-BFD or BFD control packet 20, 22. The S-BFD discriminator may be used to generalize the target 19 and can be tied to anything. This leads to generalized monitoring of "everything". The S-BFD discriminator may be, for example, a discriminator allocated for a local entity and listened for by the S-BFD reflector 18. There may be one or more S-BFD discriminators per target 19. For example, each service (e.g., IoT) in the same target may be differentiated by different S-BFD discriminators.

Figure 2A:
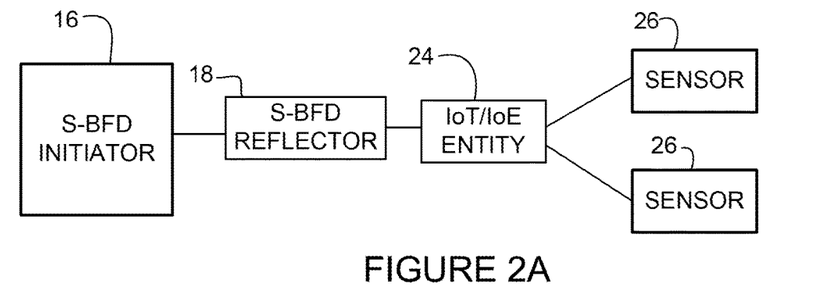
FIGS. 2A, 2B, and 2C illustrate additional examples of networks in which embodiments described herein may be implemented.
Figure 2B:
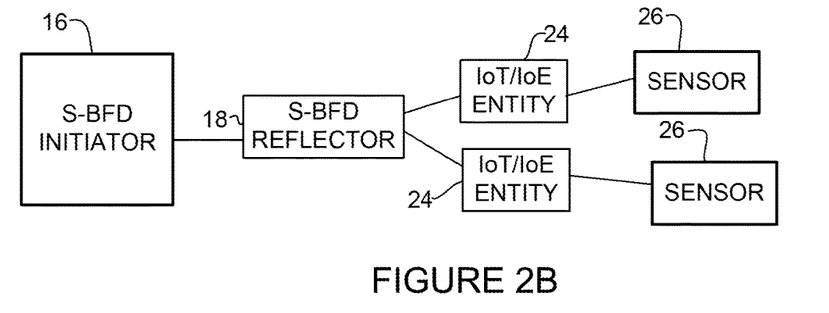
Figure 2C:
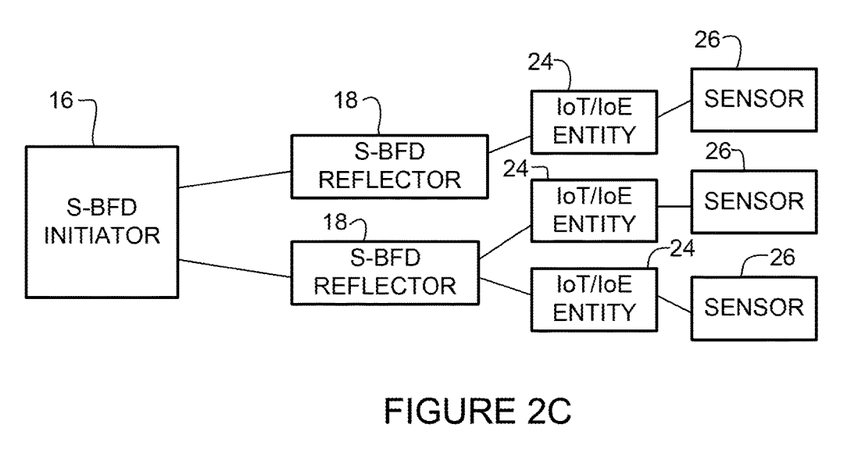

FIGS. 2A, 2B, and 2C illustrate additional types of IoT/IoE networked entities in which the embodiments described herein may be implemented. In the example shown in FIG. 2A, an S-BFD initiator 16 is in communication with S-BFD reflector 18 and IoT/IoE entity 24, which is in communication with a plurality of sensors 26. A node may include, for example, the S-BFD reflector 18 and entity 24 and be in communication with one or more nodes comprising sensors 26. The reflector 18 and entity 24 may also be located in a separate network device, as previously described.

In the example shown in FIG. 2B, initiator 16 is in communication with S-BFD reflector 18 and a plurality of IoT/IoE entities 24. Each of the entities 24 is in communication with a sensor 26. The entities 24 and sensors 26 may be co-located with the reflector 18 or located at separate devices.

FIG. 2C illustrates the S-BFD initiator 16 in communication with multiple S-BFD reflectors 18, each reflector in communication with one or more IoT/IoE entity 24 and one or more sensor 26. The entities 24 and sensors 26 may be co-located with the reflector 18 or located at separate devices. The reflectors 18 may be located at the same node or different nodes. The entities 24 may also be co-located or operating at different network devices.

It is to be understood that the networks shown in FIGS. 1, 2A, 2B, and 2C are only examples and the embodiments described herein may be implemented in networks comprising different network topologies or network devices, or using different network protocols, without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of networks. Thus, network nodes 10, 12 may be used in any suitable network topology, which may include any number of servers, hardware, accelerators, virtual machines, switches, routers, and other nodes interconnected to form a large and complex network. Nodes may be coupled to other nodes through one or more interfaces employing any suitable wired or wireless connection, which provides a viable pathway for electronic communications.

Figure 3:
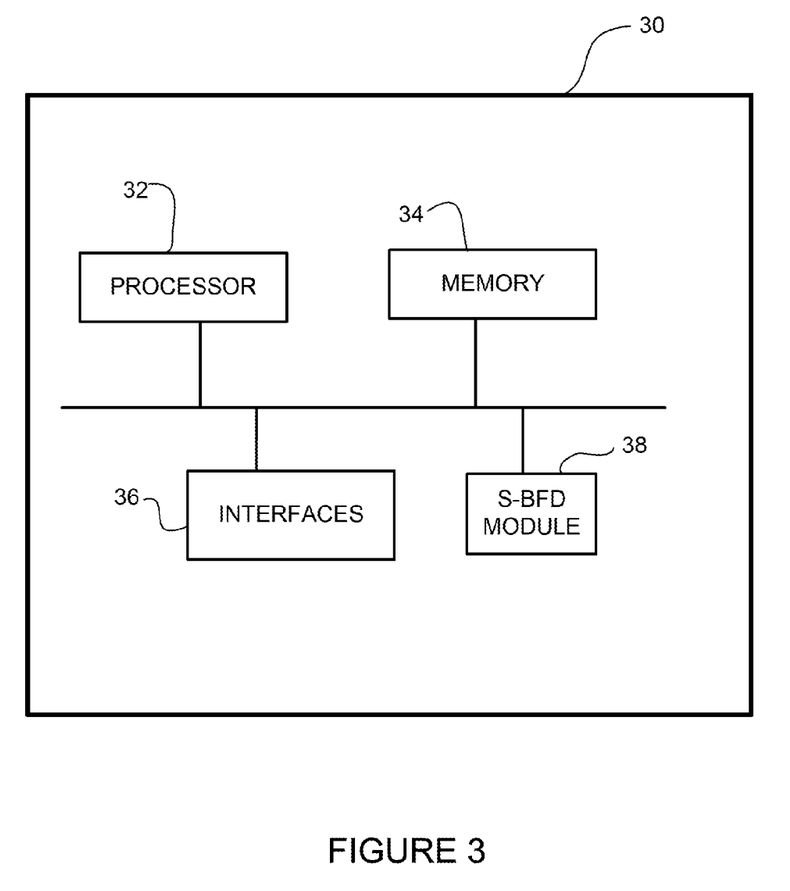
FIG. 3 depicts an example of a network device useful in implementing embodiments described herein.

FIG. 3 illustrates an example of a network device 30 (e.g., network device 12 in FIG. 1) that may be used to implement the embodiments described herein. In one embodiment, the network device 30 is a programmable machine that may be implemented in hardware, software, or any combination thereof. The network device 30 includes one or more processor 32, memory 34, network interfaces 36, and S-BFD module 38.

Memory 34 may be a volatile memory or non-volatile storage, which stores various applications, operating systems, modules, and data for execution and use by the processor 32. For example, components of S-BFD module 38 (e.g., code, logic, software, firmware, etc.) may be stored in memory 34. Memory 34 may also store one or more forwarding tables or routing tables (e.g., RIB (Routing Information Base), FIB (Forwarding Information Base), LFIB (Label FIB), and the like).

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 36 may comprise any number of interfaces (linecards, ports) for receiving data or transmitting data to other devices. The network interface 36 may include, for example, an Ethernet interface for connection to a computer or network. The network interfaces 36 may be configured to transmit or receive data using a variety of different communication protocols. The interfaces 36 may include mechanical, electrical, and signaling circuitry for communicating data over physical links coupled to the network.

The S-BFD module 38 may include, for example, an S-BFD discriminator module and an S-BFD table comprising an association between S-BFD (or BFD) discriminator values and S-BFD target identifiers. During configuration, the S-BFD discriminator module may, for example, assign a unique discriminator value to the target (e.g., aggregate discriminator, individual entity discriminators) and advertise the value and corresponding target identifier to other nodes in the network. The node may receive advertisements of the S-BFD discriminator values from other nodes and store the received information in the S-BFD table, for example. The S-BFD table may comprise any type of table, database, array, or other storage format suitable to store S-BFD parameters. The S-BFD module 38 may further include an S-BFD packet generator module or other components or modules operable to perform one or more S-BFD functions described herein.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Figure 4:
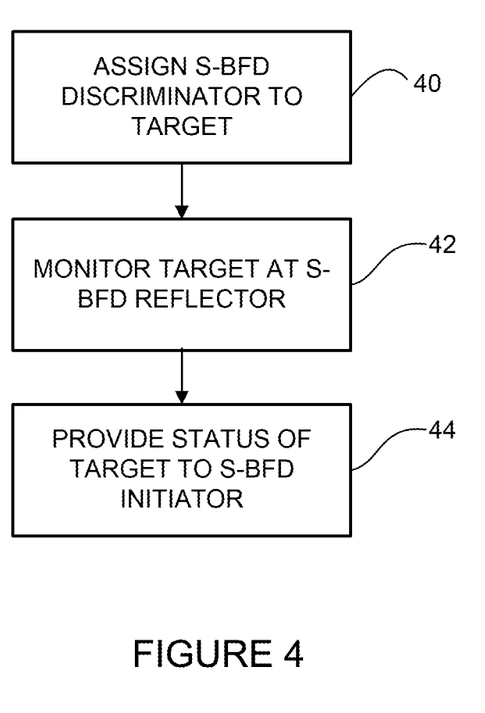
FIG. 4 is a flowchart illustrating an overview of a process for monitoring through S-BFD, in accordance with one embodiment.

FIG. 4 is a flowchart illustrating an overview of a process for monitoring applications, services, or things, through S-BFD. At step 40, a reflector node 12 assigns an S-BFD discriminator to target 19 (FIGS. 1 and 4). The target 19 may comprise any number of entities (e.g., one or more entity or sensor). As described in detail below, the target 19 may be assigned an aggregate discriminator associated with a group of entities/sensors and individual S-BFD discriminators may be assigned to each entity/sensor. The target 19 is monitored by the S-BFD reflector 18 (step 42). The monitoring may be continuous or on an as-needed demand basis. The S-BFD reflector 18 provides a status of the target (e.g., health of group of entities or individual entities) to S-BFD initiator node 10 (step 44).

It is to be understood that the flowchart shown in FIG. 4 and described above is only an example and that steps may be added, combined, or modified, without departing from the scope of the embodiments.

Referring again to FIG. 1, the following describes examples of embodiments that may be used to reduce power or memory requirements.

Some IoE/IoT devices may have strict battery/power requirements. In this case, it is preferred that the reflector 18 does not continuously monitor the target 19. Instead, when the reflector 18 receives an S-BFD packet 20 from the initiator 10, the reflector can poll for entity health at that time and decide whether or not to respond to the initiator, and with what diagnostic value. The result is that communication between the reflector 18 and target 19 (entity 24, sensor 26) is kept to a minimum and only used when needed. Further power constrained IoT devices may also setup the reflector 18 to simply watch for an interrupt generated from a sensor 26 or periodic flag setting by sensors, for example. The reflector pull model allows IoT devices to remain efficient in terms of power usage while still allowing remote devices to monitor the health of the target 19. The embodiments may also use a reflector 18 that continuously monitors the target 19, if enough power is available. Additionally, S-BFD may be terminated in a Fog environment and have a Fog router use other (proprietary, industrial) mechanisms to check liveness on behalf of the endpoint.

Some IoE/IoT devices may have strict memory requirements. S-BFD allows one stateless reflector session on the IoE/IoT device to allow multiple remote network devices to speak to it. The memory needed is therefore, just one S-BFD reflector session object as opposed to one BFD session object per remote network device.

One or more embodiments may address scaling issues that may occur due to the large number of targets to monitor in a network (e.g., thousands of sensors 26). In certain embodiments, S-BFD aggregation/summarization is used to improve scalability. For example, one or more embodiments may utilize an aggregate "all services in this node" verification or "grouped" services based on priority or type, etc., which can be assigned an S-BFD discriminator. In a scenario in which a target device hosts thousands of sensors 26, an aggregate discriminator may be used. For example, an S-BFD discriminator may be assigned to each sensor (e.g., 1 to 1000) and an aggregate S-BFD discriminator assigned to a set of sensors or all sensors. The S-BFD initiator 16 may then poll the aggregate S-BFD discriminator. In one example, when the S-BFD reflector 18 receives a control packet 20 with the aggregate S-BFD, it generates a good response if all sensors 26 are functioning. If a sensor is not functioning, the S-BFD reflector 18 generates a response with the S-BFD discriminator corresponding to the bad sensor. If more than one of the sensors is not functioning, the reflector 18 may generate a response with the aggregate S-BFD discriminator and an indication that some sensors are bad. The S-BFD initiator 16 may, for example, check all sensors to identify those sensors not functioning. With this approach, system and network loads may be significantly reduced.

The embodiments described herein may be implemented in various use-cases, including, for example, continuity checks per service function of an SFC (Service Function Chain), networked vehicles in autopilot mode, commercial cell tower maintenance, networked sensors in airframes that monitor wear and tear, data center server load and energy use balancing, personalized networked sensors for monitoring a patient's health, smart home based applications, and many others. In each of these cases, the number of sensors 26 per device, parameters and criteria of impending or actual failure, and the timelines to monitor the parameters and report to a central entity may be different, but since the IoT/IoE devices are IP (e.g., IPv6) enabled, the underlying infrastructure fault management protocol used to monitor, detect, and summarize the failures across all of these use-cases may be generalized via S-BFD.

The following provides examples of use-cases, including SFC, cell tower maintenance, and smart home applications. It is to be understood that these are only examples and that the embodiments described herein may be applied to other use-cases, without departing from the scope of the embodiments.

SFC (Service Function Chaining):

A service chain is a data structure defining a set of service nodes hosting various service functions and the order in which the service functions should be applied to the data of selected traffic. Service chaining involves the interception of traffic and directing of traffic through a series of service nodes (i.e., physical or virtual devices) that each support one or more service functions. In an SFC network, it is important for service nodes (or controller devices) to quickly detect the service function outage on remote service nodes. Having an efficient and extendable continuity check for SFC may allow the SFC network to quickly recover from service function failures via mechanisms such as re-computation/re-programming of service function path, backup activation, or clipping off next service nodes with service function outage from ECMP (Equal Cost Multipath) at service topology layer, etc.

In one example, one reflector session may be responsible for handling all S-BFD discriminators for service functions (e.g., FIG. 2A) or multiple reflector sessions may be responsible for handling separate S-BFD discriminators for service functions (e.g., FIG. 2C). The embodiments described herein allow the reflector session to monitor local availability of the corresponding service function (or functions), and turn on/off the reflection capability for a specific S-BFD discriminator.

In one example, in order for a node to perform an S-BFD continuity check to a specific service function on a specific node, it sends a control packet 20 (FIG. 1). The packet may be encapsulated to reach the target service node and have a Network Service Header (NSH) with O (OAM) bit set (see, for example, IETF draft "Network Service Header", P. Quinn et al., Jul. 3, 2014 (draft-quinn-sfc-nsh-03.txt)). The IP header may include the target service node as a destination IP and sender node as the source IP. A well-known UDP (User Datagram Protocol) port may be used for S-BFD. The Your Discriminator may be set to the target service function.

Within the S-BFD module, the Your Discriminator of a received S-BFD packet may be used to demultiplex into the correct reflector session. For example, the reflector session may examine the availability of the corresponding service function and decide whether or not the response S-BFD packet 22 should be generated and transmitted back to the originator of the S-BFD packet 20. If the service function is available, a response is generated. If the service function is not available, no response is generated.

Certain embodiments may allow for an aggregate "all services in this node" verification semantics. More specifically, a control plane for a service node servicing many service functions and chains may assign an "all services" chain identifier (ID) and S-BFD discriminator. In one embodiment, a controller such as ODL (Open Daylight) may coordinate this "all services" mode and further correlate it to an S-BFD discriminator. Alternatively, services may be grouped (e.g., per priority, type, or other parameter) and an S-BFD discriminator may be assigned (e.g., to all high priority services) and have a selective grouping of services to check.

Cell Tower Maintenance:

Remote 2G/3G/4G cell tower management is typically a very large operating expense for big service providers. The cell tower remote management should provide visibility into unmanned cell towers, fewer service trips, theft detection of different gears of the tower, and remote failure (wear/tear and environmental) detection and reporting.

In this example, the networks shown in FIG. 2B or 2C may be used. The sensors 26 may be present on the devices or externally tagged (e.g., WiCED (Wireless Internet Connectivity for Embedded Devices)) to provide fault detection and monitoring of various parameters, such as direction, temperature, humidity and pressure.

There may be a separate entity such as a router in the cell tower that collates information from different sensors 26 or multiple entities 24 that monitor the sensors and set on/off the reflection capability for specific S-BFD discriminators. The information may be based on the PULL or PUSH model, as described below.

S-BFD reflector sessions may send "Admin Down" state for resource failures. In one embodiment, an "Admin Down" with a vendor specific diagnostic code may be provided in the S-BFD packet to indicate the specific sensor detected problem. This allows for communication of more than just on/off of the reflection capability for a specific S-BFD discriminator.

Smart House Usage:

In one example, there may be a device (reflector) within a house that is connected (e.g., via network or direct cable) to appliances and electronic devices (entities 24). The device may be operable to assign an S-BFD discriminator to each connected appliance and electronic device and monitor their health (or perform this operation upon receiving an S-BFD request). An external entity (machine or human) may send S-BFD packets to the device with specific S-BFD discriminators to check the health of each appliance and electronic device. Rather than the external entity trying to check health on many different appliances and electronic devices, it would only have to talk to one device with multiple S-BFD discriminators.

The embodiments may be carried out in either a PUSH or PULL model implementation. In one example, an S-BFD discriminator may be assigned per sensor 26. The S-BFD module may do a continuous health check to each sensor 26 to be ready for providing an S-BFD response 22, or the S-BFD module can run a sensor health check when an S-BFD packet 20 with a specific discriminator (identifying the sensor) comes in, and only send a response when the health check is successful (FIG. 1). The embodiments may be used, for example, for ordered sets of sensors 26 and clusters of sensors in this application.

As can be observed from the foregoing, the embodiments described herein may use S-BFD (or similar protocols) to create a basic IP-based framework for generalized monitoring and fault detection of "everything". One or more embodiments may link the fault and health monitoring aspects of an IoT/IoE domain with the rest of the world via IP layer protocols. The embodiments may help tunnel IoT/IoE health monitoring and fault detection information via IP layer protocols. One or more embodiments may provide flexibility as to when, where, and how the health of IoE/IoT devices can be queried. Certain embodiments may employ S-BFD diagnostic code extensions for problem identification. For example, the S-BFD reflector may set a diagnostic field with vendor specific error code to indicate a problem. As described above, S-BFD aggregation/summarization may be used to efficiently monitor a scaled number of target entities. For example, an S-BFD discriminator can aggregate multiple entities if needed.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   assigning a discriminator to a target in communication with a reflector at a network device, the target comprising a plurality of entities monitored by the reflector;
   identifying at the reflector, a packet comprising the assigned discriminator, the packet transmitted from a seamless bidirectional forwarding detection (S-BFD) initiator node in an S-BFD session with the reflector node to test said plurality of entities; and
   transmitting a response packet from the reflector to the initiator in response to receiving the identified packet, the response packet comprising information for the target obtained by the reflector through monitoring of the target to provide a status of said plurality of entities to the S-BFD initiator node;
   wherein the discriminator comprises an aggregate discriminator and each of said entities is assigned an S-BFD discriminator and wherein S-BFD is stateless on the target.

2. The method of claim 1 wherein said plurality of entities comprises service functions in a service function chain.

3. The method of claim 1 wherein said plurality of entities comprise a plurality of sensors.

4. The method of claim 3 wherein the sensors are located in a cell tower.

5. The method of claim 3 wherein the sensors are located in home appliances in communication with the reflector.

6. The method of claim 1 further comprising continuously monitoring the target at the reflector.

7. The method of claim 1 further comprising monitoring the target only upon receiving the packet from the initiator.

8. The method of claim 1 wherein said information for the target comprises one or more diagnostic codes.

9. The method of claim 1 further comprising advertising the discriminator at the network device.

10. An apparatus comprising:
    a processor for assigning a discriminator to a target in communication with a reflector at the apparatus, processing a packet comprising the discriminator and received from an initiator in a seamless bidirectional forwarding detection (S-BFD) session with the reflector, and transmitting a response packet to the initiator in response to receiving the packet comprising the discriminator, the response packet comprising information for the target; and
    memory for storing said information for the target, wherein said information comprises one or more diagnostic codes associated with the target and obtained through monitoring of the target at the reflector;
    wherein the target comprising a plurality of entities monitored by the reflector and the response packet provides a status of said plurality of entities to the initiator; and wherein the discriminator comprises an aggregate discriminator and each of said entities is assigned an S-BFD discriminator and wherein S-BFD is stateless on the target.

11. The apparatus of claim 10 wherein the target comprises a plurality of entities.

12. The apparatus of claim 11 wherein said plurality of entities comprise Service functions in a service function chain.

13. The apparatus of claim 11 wherein said plurality of entities comprise a plurality of sensors.

14. The apparatus of claim 10 wherein the reflector is configured for operation at a cell tower.

15. The apparatus of claim 10 wherein the processor is further operable to continuously monitor the target.

16. The apparatus of claim 10 wherein the processor is operable to only monitor the target upon receipt of the packet.

17. Logic encoded on one or more non-transitory computer readable media for execution and when executed operable to:

assign a discriminator to a target in an Internet of Everything/Internet of Things (IoE/IoT) domain, the target comprising a plurality IoE/IoT entities;

identify the discriminator in a packet received from an initiator in a seamless bidirectional forwarding detection (S-BFD) session;

monitor and collect health information for the target;

generate a response packet comprising said health information for the target to provide a status of said plurality of IoE/IoT entities to the initiator; and transmit the response packet to the initiator;

wherein the discriminator comprises an aggregate discriminator and each of said entities is associated with a different S-BFD discriminator and wherein S-BFD is stateless on the target.

18. The logic of claim 17 wherein said health information comprises diagnostic codes associated with the target.

* * * * *